United States Patent
Solomon

(10) Patent No.: US 8,571,611 B2
(45) Date of Patent: Oct. 29, 2013

(54) SYSTEM AND METHOD FOR WIRELESSLY PROVIDING MULTIMEDIA

(75) Inventor: Yoram Solomon, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1133 days.

(21) Appl. No.: 11/801,528

(22) Filed: May 10, 2007

(65) Prior Publication Data

US 2008/0280654 A1 Nov. 13, 2008

(51) Int. Cl.
*H04M 1/00* (2006.01)

(52) U.S. Cl.
USPC ............. 455/575.2; 455/550.1; 455/552.1; 455/556.1; 455/557; 381/311; 381/315

(58) Field of Classification Search
USPC .......... 455/575.2, 552.1, 550.1, 557, 556.1; 381/315, 311
See application file for complete search history.

(56) References Cited

U.S. PATENT DOCUMENTS

| | | | |
|---|---|---|---|
| 4,500,854 A | 2/1985 | Meyer | |
| 4,654,883 A | 3/1987 | Iwata | |
| D394,058 S | 5/1998 | Fitzgerald | |
| 6,078,825 A | 6/2000 | Hahn et al. | |
| 6,230,029 B1 | 5/2001 | Hahn et al. | |
| 6,417,740 B1 | 7/2002 | Anh et al. | |
| 6,658,267 B1 * | 12/2003 | Baranowski et al. | 455/556.1 |
| 7,110,535 B2 | 9/2006 | Bodley et al. | |
| 7,110,798 B2 | 9/2006 | Nassimi | |
| 2001/0049262 A1 * | 12/2001 | Lehtonen | 455/41 |
| 2008/0226112 A1 * | 9/2008 | Lin | 381/375 |

* cited by examiner

*Primary Examiner* — Fayyaz Alam

(74) *Attorney, Agent, or Firm* — Ronald O. Neerings; W. James Brady; Frederick J. Telecky, Jr.

(57) ABSTRACT

System and method for wirelessly providing multimedia. A system includes a headset and a wireless communications device. The wireless communications device controls the operation of the headset with transmissions over a first wireless network. The headset includes a first ear piece, a second ear piece, and a connecting piece. The first ear piece has a first speaker, a first network interface to send and receive transmissions over the first wireless network, a second network interface to receive transmissions over a second wireless network, and a connecting piece. The connecting piece is coupled between the first ear piece and the second ear piece. The connecting piece includes a wire to electrically couple the second ear piece, the first ear piece, and the second network interface and to receive transmissions over the second wireless network. The wire may be made to any length since it may be embedded inside the connecting piece.

14 Claims, 3 Drawing Sheets

87.9MHz　　　　　　　　　　　　　　107.9MHz

| | FREQUENCY | | |
|---|---|---|---|
| | 87.9MHz | 107.9MHz | 2.4GHz |
| λ | 3.41M | 2.78M | 0.125M |
| 1/2λ | 1.71M | 1.39M | 0.063M |
| 1/4λ | 0.85M | 0.69M | 0.032M |
| 1/8λ | 0.43M | 0.35M | 0.016M |

SYSTEM AND METHOD FOR WIRELESSLY PROVIDING MULTIMEDIA

TECHNICAL FIELD

The present invention relates generally to a system and method for portable electronic devices, and more particularly to a system and method for wirelessly providing multimedia.

BACKGROUND

A relatively recent convenience feature available to many wireless communications devices is the use of a short range communications network, such as a Bluetooth network, to enable the use of a wireless headset when conversing on the wireless communications device. The wireless headset permits the user to communicate without the use of hands, freeing the user's hands to perform other tasks, such as driving, writing, typing, and so forth. Another added advantage of the wireless headset is the convenience afforded with the elimination of the wire that would otherwise be connecting the wireless headset to the wireless communications device.

Wireless communications devices continue to decrease in size while accumulating more features and functions. Today, it not uncommon to find wireless communications devices that maybe significantly smaller than a deck of playing cards boasting multi-band functionality, as well as extraneous features such as data management, short range wireless data communications, image and video capture, and multimedia capability, to name a few. Often included in the multimedia functionality includes the ability to receive FM transmissions and play the FM transmissions through speakers of the wireless communications device or a set of wired headphones connected to the wireless communications device.

FIG. 1a illustrates a frequency spectrum of the FM band. The FM band starts at about 87.9 MHz and ends at about 107.9 MHz. In order to adequately receive an FM signal, an antenna of appropriate length may be needed. The wavelength of a 87.9 MHz signal is about 3.41 meters (M), while it is about 2.78 M for a 107.9 MHz signal. Clearly, an antenna greater than 2.78 M in length is not feasible for use in a wireless communications device. Good performance may be achieved when antennae of fractional wavelengths are used. Antennae with lengths of about ½, ¼, or ⅛ the wavelength of the signals being received may yield sufficient performance. FIG. 1b illustrates a table of ½, ¼, and ⅛ wavelengths for FM signals at about 87.9 MHz and 107.9 MHz as well as for an exemplary 2.4 GHz signal.

Even a ⅛ wavelength antenna, about 0.35 M in length, may be impractical for inclusion in a wireless communications device. An antenna of such a great length may not be embedded inside the wireless communications device and may have to be externally attached to the wireless communications device. However, attaching such a long antenna to a wireless communications device may increase its bulk and reduce the practicality of the wireless communications device, potentially negating some of the advantages of the wireless communications device.

FIG. 2 illustrates a prior art system 200 for adding an external antenna of sufficient size to provide adequate FM reception performance. The system 200 includes a wired headset 205 coupled to a wireless communications device 210, wherein a wire 215 connecting the wired headset 205 to the wireless communications device 210 may be used as an antenna. Since the wire 215 should be on the order of several feet to several meters in length to enable a practical wired connection between the wired headset 205 and the wireless communications device 210, the wire 215 may function well as an antenna. The user may control the operation of the wireless communication device 210 operating as an FM receiver with a built-in user interface of the wireless communications device 210.

The wireless communications device 210 includes a radio frequency (RF) integrated circuit 220 that may include an FM tuner 225 and a Bluetooth unit 230. A Bluetooth wireless headset 235 may enable a user to operate the wireless communications device 210 wirelessly. An antenna 240 may enable the wireless communications device 210 to communicate with the Bluetooth wireless headset 235 and to various cellular communications networks. The antenna 240 may be an external or an internal antenna. Since the operating frequency of a Bluetooth communications network is about 2.4 GHz, a full wavelength is only 0.125 M. Therefore, a quarter-wavelength antenna is only 0.016 M in length, which may make the antenna easier to embed in a small form-factor wireless communications device.

SUMMARY OF THE INVENTION

These and other problems are generally solved or circumvented, and technical advantages are generally achieved, by embodiments of a system and a method for wirelessly providing multimedia.

In accordance with an embodiment, a headset is provided. The headset includes a first ear piece having a first speaker, a second ear piece having a second speaker, and a connecting piece mechanically coupled at a first end to the first ear piece and at a second end to the second ear piece. The first ear piece includes a first wireless network interface to send and receive transmissions over a first wireless network, and a second wireless network interface to receive transmissions over a second wireless network. The connecting piece includes a conductive wire to electrically couple the second ear piece, the first ear piece, and the second wireless network interface, and to receive transmissions over the second wireless network.

In accordance with another embodiment, a system is provided. The system includes a headset, and a wireless communications device wirelessly coupled to the headset over a first wireless network. The wireless communications device controls the operation of the headset with transmissions over the first wireless network. The headset includes a first ear piece having a first speaker, a second ear piece having a second speaker, and a connecting piece mechanically coupled at a first end to the first ear piece and at a second end to the second ear piece. The connecting piece includes a conductive wire to electrically couple the second ear piece, the first ear piece, and the second wireless network interface, and to receive transmissions over the second wireless network. The first ear piece includes a first wireless network interface to send and receive transmissions over a first wireless network, and a second wireless network interface to receive transmissions over a second wireless network.

In accordance with another embodiment, a method for providing multimedia is provided. The method includes receiving a first transmission over a first wireless network, wherein the first transmission contains control instructions, decoding the first transmission, and applying the control instructions to a multimedia display device, wherein the multimedia display device receives a second transmission containing multimedia content over a second wireless network.

An advantage of an embodiment is a long antenna for a wireless communications device may be provided to offer good signal reception performance of lower frequency transmissions without requiring the use of a wire that would inconvenience a user of the wireless communications device.

A further advantage of an embodiment is that very little additional material and/or development is needed to implement the embodiment, thus, the added convenience and performance may be realized with little or no additional cost.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications device capable of operating with a headset to deliver and control FM transmissions to a user with the control provided by the wireless communications device to the headset utilizing a short range Bluetooth wireless connection. The invention may also be applied, however, to the delivery of other radio frequency transmissions wherein a required antenna to receive such transmissions may be too long to be integrated into a wireless device. The transmissions may be audio, video, and combinations thereof. Furthermore, a wide variety of short range wireless connections may be used to control the transmissions, such as WiBree, Zigbee, IEEE 802.11, IEEE 802.15, as well as other industry standard or proprietary wireless protocols capable of transmitting control information.

Figure 3A:
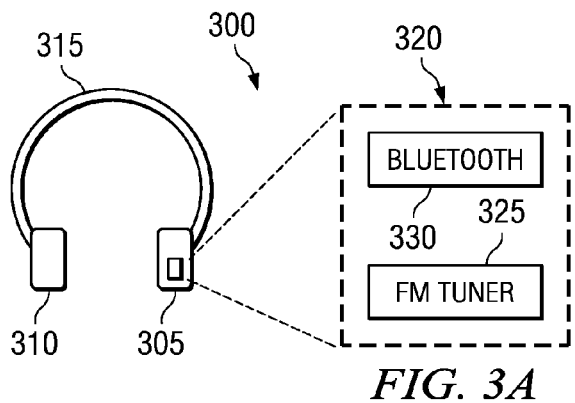
FIG. 3a is a diagram of a headset.

With reference now to FIG. 3a, there is shown a diagram illustrating a headset 300. The headset 300 may be a stereo headset, meaning that the headset 300 may have two separate ear pieces, a first ear piece 305 and a second ear piece 310. The first ear piece 305 may be placed over or in a first ear, for example, a right ear, and the second ear piece 310 may be placed over or in a second ear, for example, a left ear.

Figure 3B:
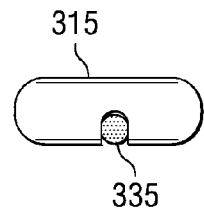
FIG. 3b is a diagram of a connecting piece of a headset.

The first ear piece 305 and the second ear piece 310 may be coupled by a connecting piece 315. The connecting piece 315 may have sufficient rigidity to maintain a proper position of the first ear piece 305 and the second ear piece 310. The connecting piece 315 may contain an electrical wire or wires that may be used to conduct audio signals in the form of electrical waveforms to the second ear piece 310 from the first ear piece 305. FIG. 3b illustrates a cross-sectional view of the connecting piece 315, showing a wire 335 that may be used to electrically couple the second ear piece 310 to the first ear piece 305. If additional wires are needed, they may also be embedded in the connecting piece 315. Alternatively, the connecting piece 315 may be formed from an electrically conductive material and may be used to directly conduct electrical waveforms between the first ear piece 305 and the second ear piece 310. The connecting piece 315 may be formed from a plastic, wood, fiber, metal, and combinations thereof.

Figures 1A, 1B, 2:
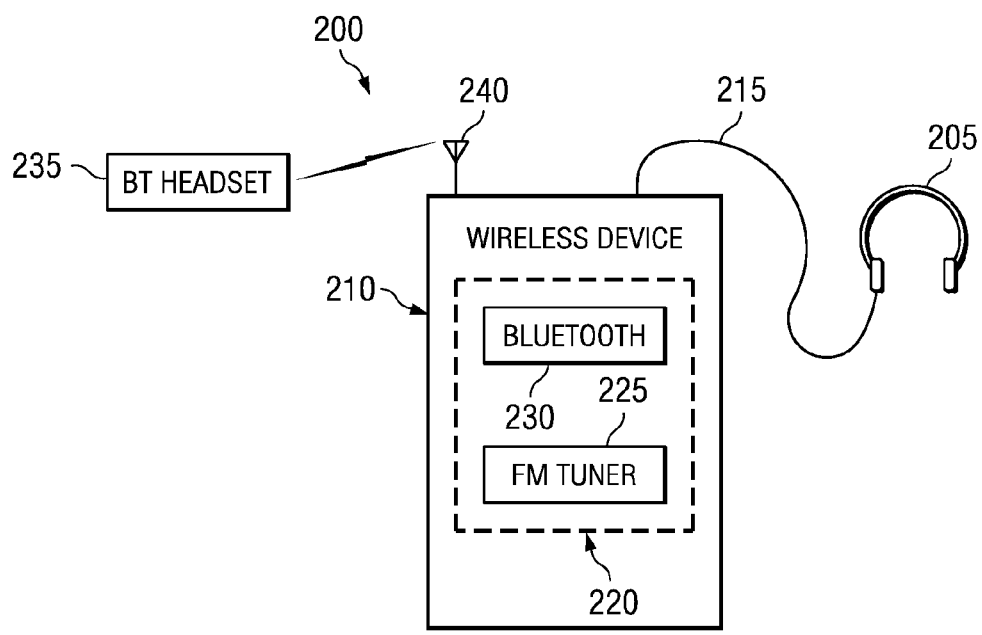
FIG. 1a is a diagram of a frequency spectrum of FM radio.
FIG. 1b is a table of various fractional wavelengths of different FM radio signals and an exemplary 2.4 GHz signal.
FIG. 2 is a diagram of a prior art system for adding an antenna for enabling the reception of FM transmissions.

One of the two ear pieces, for example, the first ear piece 305, may contain electronics and circuitry that may be needed to enable the headset 300 to receive FM transmissions and communicate wirelessly. The electronics and circuitry may include an RF integrated circuit 320 that may enable the headset 300 to tune to FM transmissions (such as an FM tuner 325) and communicate using the Bluetooth communications protocol (such as a Bluetooth unit 330). The FM tuner 325 and the Bluetooth unit 330 (the RF integrated circuit 320) may be the same as the RF integrated circuit 220 shown in FIG. 2, thereby potentially reducing development costs by reusing parts already developed and tested.

The FM tuner 325 may contain an audio circuit that may provide the electrical signals that when provided to the first ear piece 305 and the second ear piece 310, will create audio waveforms that may be heard by a wearer of the headset 300. Although the discussion focuses on the first ear piece 305 containing electronics and circuitry necessary to receive FM transmissions and perform Bluetooth communications, the electronics and circuitry may be located in the second ear piece 310. Alternatively, the electronics and circuitry may be external to either the first ear piece 305 or the second ear piece 310 and may be in a self-contained unit coupled to the headset 300. The self-contained unit may be attached to the headset 300 somewhere along the connecting piece 315 or at the first ear piece 305 or the second ear piece 310.

The electrical wire 335 contained in the connecting piece 315 may also be used as an antenna to permit the FM tuner 325 to receive FM transmissions. Since the connecting piece 315 may be used to connect the first head piece 305 to the second head piece 310, the electrical wire contained within the connecting piece 315 may have an overall length that meets or closely meets a length required to provide adequate FM reception. Additionally, it may be possible to include a longer length of wire in the connecting piece 315 to function as an antenna if the electrical wire contained in connecting piece 315 that may be used to conduct the electrical signals may not be sufficiently long.

Figure 3C:
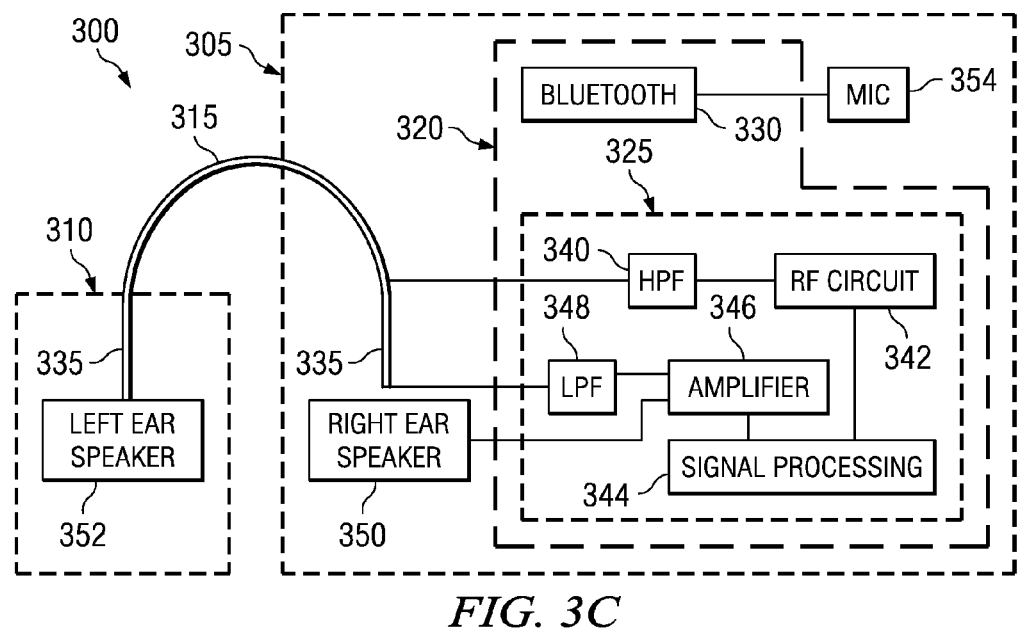
FIG. 3c is a diagram of a detailed view of a headset.

The diagram shown in FIG. 3c illustrates a detailed view of the headset 300. The FM tuner 325 includes a high pass filter (HPF) 340 coupled to the wire 335 contained within the connecting piece 315. The HPF 340 may pass electrical signals that correspond to received FM transmissions. The electrical signals being received by the wire 335 operating as an antenna. An RF circuit 342 coupled to the HPF 340 may mix the filtered and received FM transmissions from the HPF 340 down to an internal frequency signal that may be processed by a signal processing circuit 344. The signal processing circuit 344 may extract a signal containing audio information from the mixed signal from the RF circuit 342.

An amplifier 346 may then boost the power of the signal containing audio information to a level consistent with a sound level specified by a user of the headset 300. A low pass filter (LPF) 348 may then filter out any extraneous signals with frequencies above audible range and the filtered signal containing audio information may then be asserted onto the wire 335 contained within the connecting piece 315 to drive speakers in a right ear speaker 350 and a left ear speaker 352. The Bluetooth unit 330 may have its own antenna or it may also be similarly coupled to the wire 335, allowing both the FM tuner 325 and the Bluetooth unit 330 to share the wire 335 as an antenna. Although described in singular terms, the wire 335 may contain multiple conductors or may comprise multiple electrically isolated conductors.

The headset 300 may also include a microphone (MIC) 354 coupled to the Bluetooth unit 330. The microphone 354 may enable the headset 300 to be used in conjunction with a wireless communications device and provide a hands-free operation mode, wherein a conversation may be held between a user of the wireless communications device and another party without the user having to hold the wireless communications device up to his or her ear.

Figure 3D:
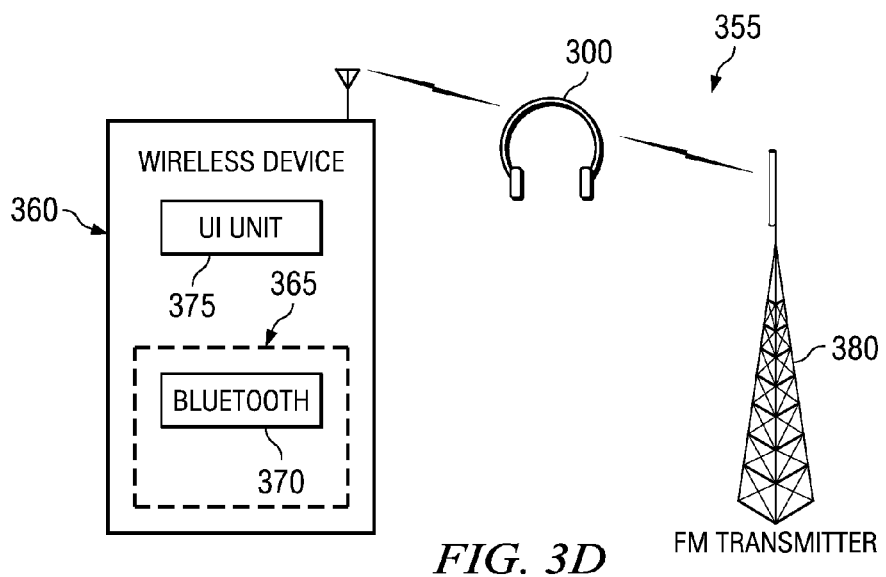
FIG. 3d is a diagram of a system for wirelessly providing multimedia.

The diagram shown in FIG. 3d illustrates a system 355 for wirelessly providing audio to a user. The system 355 includes the headset 300 and a wireless communications device 360. The wireless communications device 360 includes Bluetooth functionality via an RF chip 365 and a Bluetooth unit 370 contained therein. The headset 300 and the wireless communications device 360 may communicate via a Bluetooth network, allowing the headset 300 to be used to make and place voice calls. Additionally, the wireless communications device 360 may be used to control the operation of the headset 300. The wireless communications device 360 includes a user interface (UI) unit 375 that provides a user interface for the wireless communications device 360 with user input keys, display, audio feedback, and so forth. The user interface may also be used to control the operation of the headset 300.

The user may enter commands via the user interface and if the commands are intended for controlling the headset 300, such as adjusting the volume, changing a channel, turning the headset 300 on and off, and so forth, the user interface unit 375 may pass the commands to the headset 300 through transmissions using the Bluetooth network. Although the headset 300 receives Bluetooth transmissions from the wireless communications device 360, the headset 300 receives FM transmissions from an FM transmitter 380, which it decodes and turns into audio for the user of the headset 300.

The discussion above focuses on the headset 300 receiving control commands via a Bluetooth network from a wireless communications device 360 to control the FM tuner 325 located in the headset 300. The control commands from the wireless communications device 360 may be transmitted using other wireless networks, such as WiBree, Zigbee, IEEE 802.11, IEEE 802.15, as well as other industry standard or proprietary wireless protocols, and combinations thereof. Furthermore, the headset 300 features the FM tuner 325, however, the headset 300 may also contain tuners for other radio bands, such as AM, satellite radio, various shortwave frequencies, and so forth. Additionally, the headset 300 may include displays for displaying visual and other forms of information transmitted over RF waves. Examples may include television, multimedia servers transmitting multimedia over RF waves, health monitor information, proximity sensor information, security system sensor information, home and building automation information, and so forth. Therefore, the discussion of Bluetooth and FM should not be construed as being limiting to either the spirit or scope of the present invention.

Figure 4:
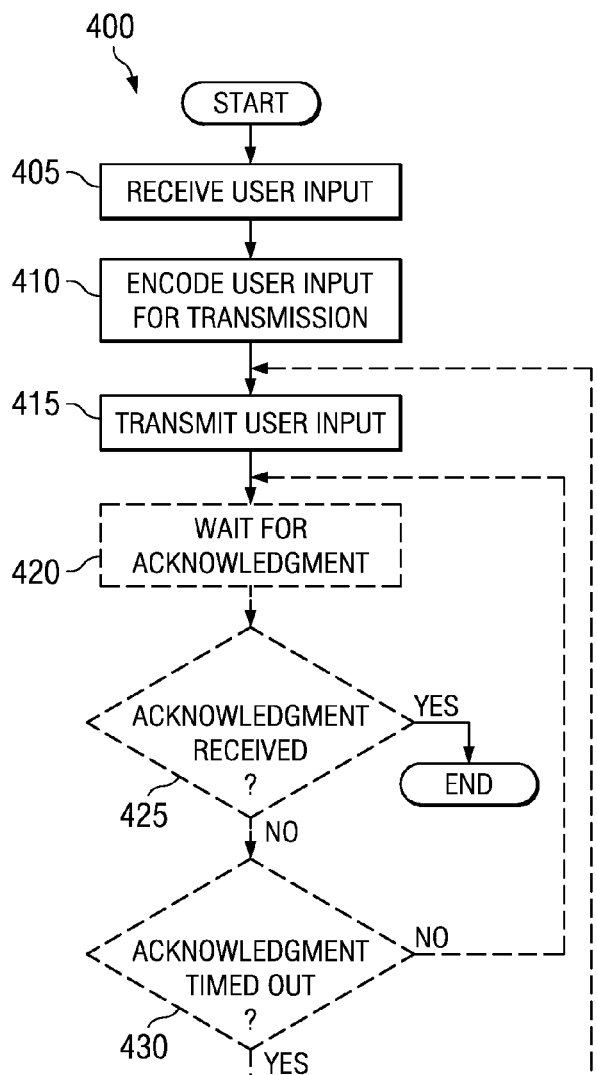
FIG. 4 is a diagram of an algorithm for wirelessly controlling a system used to wirelessly provide multimedia.

With reference now to FIG. 4, there is shown a diagram illustrating an algorithm 400 for wirelessly controlling the FM tuner 325 in the headset 300. The algorithm 400 may execute on a controller located in the wireless communications device 360, for example. The algorithm 400 may begin execution when a user of the wireless communications device 360 enters user input to control the FM tuner 325 located in the headset 300 (block 405). Examples of user input may be commands to adjust the volume level, change the channel, increase or decrease the tuning frequency, turn the FM tuner 325 on/off, or so on.

After receiving the user input from the user, the controller may need to encode the user input into a format that is compatible with a wireless communications network used by the wireless communications device 360 to communicate with the headset 300 (block 410). The encoding of the user input may include placing the user input into a format specific to the wireless communications network, inserting error detection and/or error recovery information into the user input, rearranging the ordering of the user input, and so forth. The encoded user input may then be transmitted to the headset 300 (block 415). The algorithm 400 may now be complete.

However, the algorithm 400 may optionally wait for the arrival of an acknowledgment (block 420). The acknowledgment may be used to inform the wireless communications device 360 of a successfully received transmission and may be automatically generated by the Bluetooth unit 330 in the headset 300 or the acknowledgment may be generated by the headset 300 to inform the wireless communications device 360 of a successfully received user input. If an acknowledgment has been received (block 425), then the transmission of the user input may be complete.

If an acknowledgment has not been received, a check to determine if the wireless communications device 360 has waited longer than a predetermined amount of time, i.e. has the wait for an acknowledgment timed out (block 430). If the wait has not timed out, then the wireless communications device may continue to wait (block 420). If the wait has timed out, the wireless communications device 360 may resend the user input (block 415).

Figure 5:
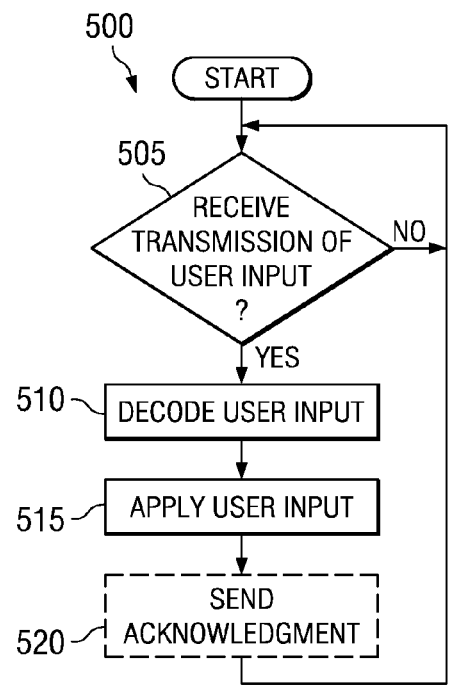
FIG. 5 is a diagram of an algorithm for wirelessly providing multimedia.

With reference now to FIG. 5, there is shown a diagram illustrating an algorithm 500 for wirelessly providing multimedia. The algorithm 500 may execute on a system, such as the headset 300, and may begin when a transmission containing user input is received (block 505). The transmission may be received over a wireless communications network, such as a Bluetooth network. The system may remain in a wait state, waiting for a transmission containing user input. Until the system receives such a transmission, it may remain in the wait state. Once a transmission has been received, the transmission may need to be decoded to extract the user input, for example, by the Bluetooth unit 330 in the headset 300 (block 510). The decoding of the received transmission may include detecting and correcting any errors resulting from the transmission, rearranging the user input so that it is back to an original order, and so on.

With the user input decoded from the received transmission, the user input may be applied to the system (block 515).

The system receives multimedia content via transmissions from a wireless network, wherein the wireless network may support one-way or two-way transmissions. For example, the volume of an audio signal created by the FM tuner 325 may be adjusted, a tuning frequency may be changed, and so forth. The system may optionally return (send) an acknowledgment packet pack to a sender of the transmission (block 520). Depending on the wireless communications network used, the acknowledgment packet may automatically be returned upon receipt of the transmission, successful decoding of the transmission, or the acknowledgment packet must expressly be transmitted by the system.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A headset comprising:
   a first ear piece having a first speaker, the first ear piece comprising,
      a first wireless network interface, the first network interface configured to send and receive transmissions over a first wireless network, and
      a second wireless network interface, the second network interface configured to receive transmissions over a second wireless network;
   a second ear piece having a second speaker; and
   a connecting piece mechanically coupled at a first end to the first ear piece and at a second end to the second ear piece, the connecting piece comprising a conductive wire configured to electrically couple the second ear piece to the first ear piece, wherein said conductive wire is connected to said second network interface and operates as an antenna to receive air interface signaling associated with the second wireless network and provides the received air interface signaling as input to said second network interface, and wherein said conductive wire receives output signal from said second network interface and provides said output signaling as input to said second speaker.

2. The headset of claim 1, wherein the conductive wire is embedded inside the connecting piece.

3. The headset of claim 1, wherein the connecting piece is shaped so that it holds the first ear piece adjacent a first ear of a wearer and the second ear piece adjacent a second ear of the wearer.

4. The headset of claim 1, wherein said output comprises audio signals.

5. The headset of claim 4, wherein the second wireless network interface provides said audio signals to the first speaker via a second wire.

6. The headset of claim 1, wherein the second network interface comprises:
   a low pass filter coupled to the conductive wire, wherein said output signaling includes audio signals passed by said low pass filter; and
   a high pass filter coupled to the conductive wire to filter said received air interface signaling.

7. The headset of claim 1, wherein the conductive wire is further coupled to the first wireless network interface, and wherein the conductive wire operates as an antenna that sends and receives air interface signaling associated with the first wireless network.

8. The headset of claim 1, wherein the first ear piece includes a further conductive wire connected between said second network interface and said first speaker to provide output signal from said second network interface to the first speaker.

9. The headset of claim 1, wherein the connecting piece is made from a material selected from the group consisting of: plastic, metal, fiber, fabric, and combinations thereof.

10. The headset of claim 1, wherein the connecting piece is the conductive wire.

11. A system comprising:
    a headset comprising,
       a first ear piece having a first speaker, the first ear piece comprising,
          a first wireless network interface, the first network interface configured to send and receive transmissions over a first wireless network, and
          a second wireless network interface, the second network interface configured to receive transmissions over a second wireless network,
       a second ear piece having a second speaker, and
       a connecting piece mechanically coupled at a first end to the first ear piece and at a second end to the second ear piece, the connecting piece comprising a conductive wire configured to electrically couple the second ear piece to the first ear piece, wherein said conductive wire is connected to said second network interface and operates as an antenna to receive air interface signaling associated with the second wireless network and provides the received air interface signaling as input to said second network interface, and wherein said conductive wire receives output signal from said second network interface and provides said output signaling as input to said second speaker; and
    a wireless communications device wirelessly coupled to the headset over the first wireless network, the wireless communications device to control the operation of the headset with transmissions over the first wireless network".

12. The system of claim 11, wherein the second wireless network interface receives multimedia transmissions over the second wireless network, and wherein information contained within the multimedia transmissions are provided to a user over the first speaker and the second speaker.

13. The system of claim 11, wherein the headset further comprises a microphone coupled to the first wireless network interface, the microphone to convert audible information into electrical signals.

14. The system of claim 11, wherein the second network interface comprises:
    a low pass filter coupled to the conductive wire, and an amplifier coupled to drive the low pass filter, wherein the low pass filter provides said output signaling; and a high pass filter coupled to the conductive wire to filter said received air interface signaling, and an RF circuit coupled to the high pass filter to receive the filtered air interface signaling.

* * * * *